United States Patent [19]  [11] 4,368,182
Mills et al.  [45] Jan. 11, 1983

[54] CARBON BLACK PRODUCTION

[75] Inventors: King L. Mills; Paul J. Cheng, both of Bartlesville, Okla.

[73] Assignee: Phillips Petroleum Company, Bartlesville, Okla.

[21] Appl. No.: 263,949

[22] Filed: May 15, 1981

[51] Int. Cl.³ .......................... C01B 31/02; C09C 1/48
[52] U.S. Cl. .................................................... 423/450
[58] Field of Search ........................ 423/450, 451, 449

[56] References Cited

U.S. PATENT DOCUMENTS

| | | | |
|---|---|---|---|
| 2,672,402 | 3/1954 | Stokes | 423/450 |
| 3,044,859 | 6/1962 | Parker | 23/209.4 |
| 3,369,870 | 2/1968 | Ganz et al. | 423/450 |
| 3,401,020 | 9/1968 | Kester et al. | 23/209.4 |
| 4,261,964 | 4/1981 | Scott et al. | 423/450 |

Primary Examiner—O. R. Vertiz
Assistant Examiner—Gregory A. Heller

[57] ABSTRACT

A start-up procedure for a carbon black furnace wherein a low Btu off-gas as can be obtained from the filters in which the carbon black is separated from the carbon black reactor effluent is admixed with a high Btu fuel and passed along with combustion-supporting gas to a combustion zone in a carbon black reactor furnace to create a desired vortex of hot combustion gases therein suitable for production of carbon black and wherein when combustion of part of the feedstock introduced into said vortex the temperature can be maintained phasing out or discontinuing the flow of said high Btu fuel.

2 Claims, 1 Drawing Figure

CARBON BLACK PRODUCTION

BRIEF DESCRIPTION OF THE INVENTION

In the starting of a carbon black reactor operation, a low Btu off-gas, as can be obtained from the operation or another operation, is combined with a high Btu fuel gas to generate in a provided combustion zone a vortex of hot gases of a temperature such that desired carbon black can be produced from a suitable carbonaceous feedstock which is injected into the vortex and as the feedstock is in part combusted and the hot gases' temperature can be maintained, the flow of high Btu fuel is at least in part if not totally discontinued whereupon the operation proceeds using substantially only low Btu off-gas during the production of carbon black from the feedstock.

BRIEF DESCRIPTION OF DRAWING

In the drawing is shown a carbon black operation in which, according to the invention, there are provided both a high Btu fuel and a low Btu off-gas injection to a precombustion or combustion zone in a carbon black reactor. Low Btu off-gas from the carbon black bag filter, which may be combined with low Btu gas from another operation, e.g. from another carbon black unit, is preheated by indirect heat exchange with carbon black containing reactor gaseous effluent and passed to the combustion zone.

DETAILED DESCRIPTION

Figure 1:
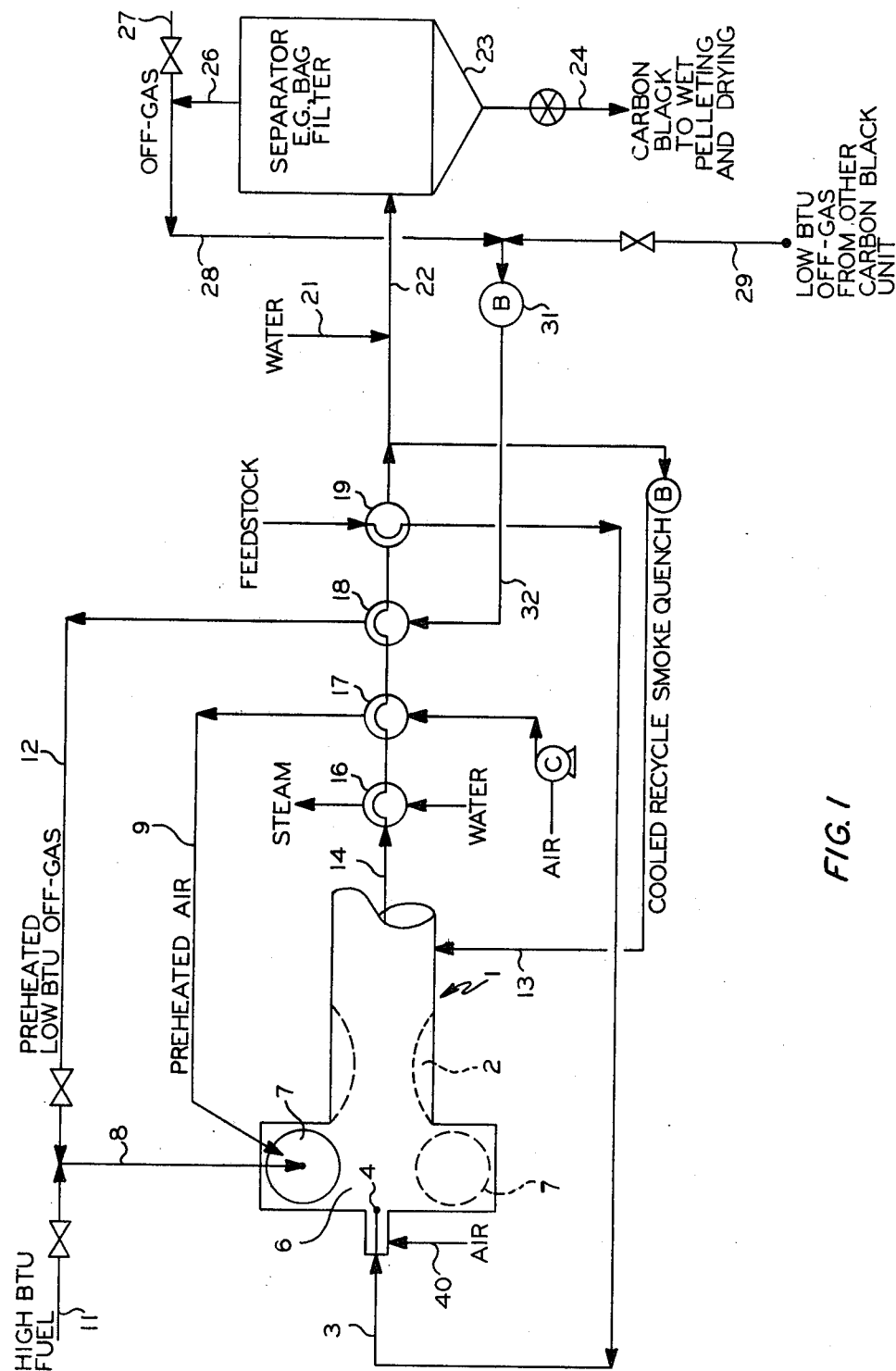

This invention relates to the production of carbon black. In one of its aspects it relates to a method for the production of carbon black utilizing a low Btu gas which will not sustain its own combustion at ambient conditions such as the low Btu off-gas obtained from the separation or filter step in which carbon black is recovered from carbon black furnace reactor effluent gases. In a further aspect of the invention it relates to a carbon black furnace reactor operation start-up procedure.

In one of its concepts, the invention provides a start-up procedure for the production of carbon black using a carbon black furnace reactor wherein low Btu off-gas obtained from the filters in which carbon black is separated from the carbon black reactor effluent smoke is passed together with a high Btu fuel, e.g., methane gas or natural gas, and the like, into the precombustion or combustion zone to create therein a vortex of hot gases at a temperature at which desired carbon black can be produced and wherein a desired feedstock is introduced into said vortex whereupon when combustion of some of the feedstock in the combustion or precombustion zone the temperature is maintainable and the injection of high Btu fuel gas is discontinued or phased out so that the operation is continued substantially only with use of the low Btu off-gas during production of carbon black from the charged feedstock.

In another of its concepts the invention provides an operation as described wherein the off-gas from the filters or bag house is preheated by indirect heat exchange with the hot carbon black-containing gases emanating from the carbon black reactor prior to being charged to the precombustion or combustion zone.

In these times when we depend upon a substantial import of energy producing oil and gas from abroad to supply our energy needs, it is incumbent upon us to devise ways and means to save energy in every way possible.

We have conceived an operation of a carbon black reactor for starting the same through produced low Btu combustible gases as herein further described. The expression "low Btu gases" is meant to include gases incapable of self-supporting of combustion at ambient conditions and having heating values ranging from about 50 to about 150 BTU/SCF usually about 60 to about 100 in the same basis. The high Btu gases will have heating values of at least about 600 BTU/SCF.

Accordingly, it is an object of this invention to produce carbon black.

It is another object of this invention to provide a new procedure for starting up a carbon black reactor.

A further object of the invention is to save energy.

A still further object of the invention is to so utilize a low Btu off-gas in the start-up of a carbon black reactor as to effect considerable savings of high Btu fuel.

Other aspects, concepts, objects and several advantages of the invention are apparent from a study of this disclosure, drawing and the appended claims.

According to the invention there is provided a start-up procedure for a carbon black producing reactor furnace which comprises at start-up feeding a mixture of low Btu off-gas and high Btu fuel into the precombustion or combustion zone of the carbon black reactor, therein creating a vortex of hot combustion gases at a temperature suitable for initiating the production of carbon black, thereupon injecting a suitable carbonaceous feedstock for producing desired carbon black, and as said feedstock produces by partial combustion thereof a desired amount of heat to maintain the desired carbon black producing temperature, phasing out the high Btu fuel so that the operation can be continued substantially only with said low Btu off-gas.

Also, according to the invention, a low Btu off-gas preferably is the off-gas obtained from the carbon black filters or bag house wherein the produced carbon black entrained in the reactor effluent (smoke) is separated from low Btu combustible gases accompanying the same.

The composition of the off-gas is well known in the art. It is known that the off gas comprises combustible hydrogen, carbon monoxide, and other combustibles. These combustibles are relied upon in the low Btu off-gas to produce heat when operation has gotten underway.

The following is a description of an embodiment of the invention.

A carbon black reactor 1, is provided with optional Venturi 2, feedstock (carbonaceous material) injection conduit 3, and outlet nozzle 4 into precombustion (sometimes called combustion) zone 6. Hot combustion gases enter tangential tunnels 7 forming a vortex in zone 6. The hot combustion gases are produced by combusting a fuel 8 with excess oxygen containing gas such as preheated air 9. Fuel 8 can be high Btu fuel 11, such as natural gas, methane, or the like having a heating value of about 1,000 Btu/Std. ft$^3$ (SCF) and fuel 12 can be preheated off-gas which has a relatively low Btu value of about 100 Btu/SCF. Details of the fuel 11 and off-gas 12 are set out herebelow. Carbon black produced in reactor 1 (partially produced in zone 6) is quenched to stop the carbon black forming reaction by quench or prequench 13, now preferably a portion of the subsequently cooled reactor effluent, referred to as smoke. The prequenched reactor effluent is passed by conduit 14 through a series of heat recovery zones, depicted here as steam boiler 16, air preheater 17, off-gas preheater 18, and feed stock preheater 19. Optionally, trim water quench 21 can be used so that the quenched effluent or smoke 22 is at the proper temperature to avoid damaging separator 23, usually a bag filter unit or bag house. Separated carbon black is removed from separator 23 via 24 for further handling, e.g. wet pelleting, drying of pellets, and sales. Gas substantially freed from carbon black, referred to as off-gas, is removed from separator 23 by 26. When desired, a portion of this off-gas can be removed at 27 for use in the wet pellet dryer (not shown) as part of the fuel therefor. Low Btu off-gas is passed by way of 28, can have low Btu off-gas from other sources, such as from other carbon black plants, added thereto via 29, as desired, pressured by blower 31 and passed by 32, indirect heater 18, as the preheated off-gas 12, above described.

When starting up with only low Btu off-gas, about 2000° F. to 2400° F. is the maximum attainable tangential combustion gas. According to the invention during start-up of a carbon black reactor, to increase the reactor temperature at a rapid rate to produce carbon black from a feedstock using as the main source of fuel an off-gas of low Btu value, the following steps are employed:

(1) Preheated air 9, off-gas 12, and high Btu fuel, e.g. natural gas or methane, or the like, 11 are charged to the tangential combustion tunnels to produce hot combustion gases at about 2700 to 3000° F., which gases produce the vortex flow in the precombustion zone 6;

(2) Feedstock 3 is then charged at a rate to produce the type of carbon black desired;

(3) As the charged feedstock 3 is in part combusted with the excess air available for combustion, additional heat is realized, and the flow of the high Btu value fuel 11 is cut back and the flow of the low Btu off-gas flow is continued.

The carbon black reactor unit is now operating with a minimum (to zero) of high Btu value fuel gas 11, a maximum of low Btu preheated off-gas 12, preheated air 9 in the proper excess amount, and the proper amount of feedstock 3 charged to make the desired type of carbon black.

| Calculated Example (Start-up) | | | | |
|---|---|---|---|---|
| | For N 220 Black | | | |
| | Step 1 | Step 2 | Step 3 | Step 4 |
| (3) Feedstock, gal/hr. | 0 | 209 | 226 | 244 |
| Temperature, °F., | — | 350 | 350 | 350 |
| (11) Methane, SCF/hr., | 8160 | 5440 | 2720 | 0 |
| Temperature, °F., | 80 | 80 | 80 | — |
| (12) Off-Gas, SCF/hr., | 91250 | 91250 | 91250 | 91250 |
| Temperature, °F., | 1200 | 1200 | 1200 | 1200 |
| (9) Tangential Air, SCF/hr., | 158290 | 158290 | 158290 | 158290 |
| Temperature, °F., | 1200 | 1200 | 1200 | 1200 |
| (7) Hot Gases, SCF/hr., | 248200 | 245400 | 242700 | 240000 |
| Temperature, °F., | 3020 | 2730 | 2440 | 2160 |
| (40) Nozzle Air, SCF/hr., | 8000 | 8000 | 8000 | 8000 |
| Temperature, °F., | 150 | 150 | 150 | 150 |

Reasonable variation and modification are possible in the scope of the foregoing disclosure, drawing and the appended claims to the invention in the essence of which is that there has been provided a startup procedure for the operation of a carbon black producing furnace reactor wherein a low Btu off-gas is used together with a high Btu fuel to create a desired vortex of hot combustion gases and to maintain the same while there is injected into the produced vortex a suitable feedstock to make a desired carbon black and when the feedstock through partial combustion of the same is beginning to maintain the desired temperature for producing carbon black phasing out the high Btu fuel, substantially as described.

We claim:

1. A start-up procedure for a carbon black furnace reactor which yield an effluent and in which a carbon black is produced from a suitable feedstock which comprises admixing a low Btu off-gas having a heating value ranging from about 50 to about 150 Btu/SCF with a high Btu fuel having a heating value of at least about 600 Btu/SCR, injecting the mixture thus obtained along with combustion-supporting air into the combustion section of a precombustion zone of a carbon black furnace and therein creating a vortex flow of hot combustion gases at a temperature of about 2700° to 3000° F. suitable for initiating the production of carbon black, injecting into said vortex flow of hot combustion gases of desired temperature thus produced a carbon black producing feedstock and when said feedstock by partial combustion of the same is maintaining the desired carbon black forming temperature in said zone phasing out or discontinuing the flow of said high Btu fuel in a manner that substantially only the low Btu off-gas is used as fuel gas said combustion supporting air and said low BTU off-gas being indirectly, separately heat exchanged with said effluent.

2. A procedure according to claim 1 wherein the off-gas is obtained from the carbon black filters in which the carbon black is removed from the combustion gases containing the same emanating from the carbon black reactor furnace.

* * * * *